United States Patent [19]

Grubka et al.

[11] Patent Number: 4,664,688

[45] Date of Patent: May 12, 1987

[54] METHOD AND APPARATUS FOR FORMING GLASS FIBERS

[75] Inventors: Lawrence J. Grubka, Heath; Randall E. Nyhart, Granville, both of Ohio

[73] Assignee: Owens-Corning Fiberglas Corporation, Toledo, Ohio

[21] Appl. No.: 810,000

[22] Filed: Dec. 17, 1985

[51] Int. Cl.[4] .............................................. C03B 37/02
[52] U.S. Cl. ................................................ 65/1; 65/2; 210/420; 210/498; 251/117; 251/206
[58] Field of Search ................ 65/1, 2; 210/420, 498; 251/117, 304, 206; 137/625.33

[56] References Cited

U.S. PATENT DOCUMENTS

| | | | |
|---|---|---|---|
| 721,821 | 3/1903 | Myers | 251/206 X |
| 1,639,133 | 8/1927 | Greene | 210/498 X |
| 3,094,140 | 6/1963 | Miller | 137/625.33 X |
| 3,269,816 | 8/1966 | Helbing | 65/2 |
| 3,294,503 | 12/1966 | Machlan et al. | 65/1 |
| 3,342,420 | 9/1967 | Roulet et al. | 251/206 X |
| 3,573,014 | 3/1971 | Strickland et al. | 65/1 |
| 4,436,541 | 3/1984 | Pelligrin et al. | 65/2 |
| 4,488,891 | 12/1984 | Grubka et al. | 65/2 |
| 4,553,994 | 11/1985 | Greene et al. | 65/2 |

Primary Examiner—Robert Lindsay
Attorney, Agent, or Firm—Patrick P. Pacella; Ted C. Gillespie; Ronald E. Champion

[57] ABSTRACT

A feeder for the production of glass filaments is provided with a mechanical valve means to render the operation dripless or non-dripless as desired. Preferably, the feeder is rendered non-dripless when the restart of filament formation from idle orifices is desired.

16 Claims, 7 Drawing Figures

METHOD AND APPARATUS FOR FORMING GLASS FIBERS

TECHNICAL FIELD

The invention disclosed herein relates to the production of glass fibers wherein process interruptions from bead drops and flooding are reduced while providing improved restartability.

BACKGROUND OF THE INVENTION

In the production of glass filaments, it is conventional to flow streams of molten glass from closely spaced orifices in the bottom or discharge wall of an electrically heated, precious metal alloy feeder or bushing.

For the production of continuous glass filaments, there are two general types of feeders available. The more widely used type employs a bottom wall having stream defining orifices provided in projections or tips, depending from the exterior surface of the bottom wall. The second, a more recently developed type, employs an orificed bottom wall having a planar exterior surface. The first type is known as a "tipped" feeder; for example, see U.S. Pat. Nos. 4,222,757 and 4,321,074. The second type of feeder is known as a "tipless" feeder; for example, see U.S. Pat. No. 3,905,790.

Historically, glass fiber forming operations have been plagued by primarily two phenomena occurring after a filament break—flooding and bead drops.

Recently, a glass fiber forming system has been developed that dramatically reduces the effects of disruptive filament breaks. U.S. Pat. No. 4,488,891, issued to Grubka et al, discloses a fiber forming system otherwise known as "dripless". That is, during operation if a filament breaks, the glass will cease to flow from the orifice associated with the break while attenuation is maintained from the remaining orifices. Thus, the glass does not drip from the orifice of the severed filament.

The advantages of such a system are clear. One of the disadvantages is increased "restart" times, as compared to conventional feeders, when the number of filament breaks ultimately requires the restart of the attenuation process at the disrupted orifices.

SUMMARY OF THE INVENTION

This invention provides, in part, the decreased sensitivity to filament breaks provided by the "dripless" types of feeders while also providing, in part, the ease of "restartability" provided by the heretofore "conventional" or "non-dripless" types of feeders.

This is accomplished by modifying or adjusting the flow restriction through the pressure regulator plate to decrease the pressure drop through the plate sufficient to cause the effective head pressure of the glass at the discharge wall to increase above the "dripless" pressure to cause the glass to "bead down". Once the glass has beaded down from the orifices and attenuation has been restarted, the flow restriction is reduced or re-set to its original arrangement to render the feeder again "dripless" during production filament attenuation.

BEST MODE OF CARRYING OUT THE INVENTION

Figure 1:
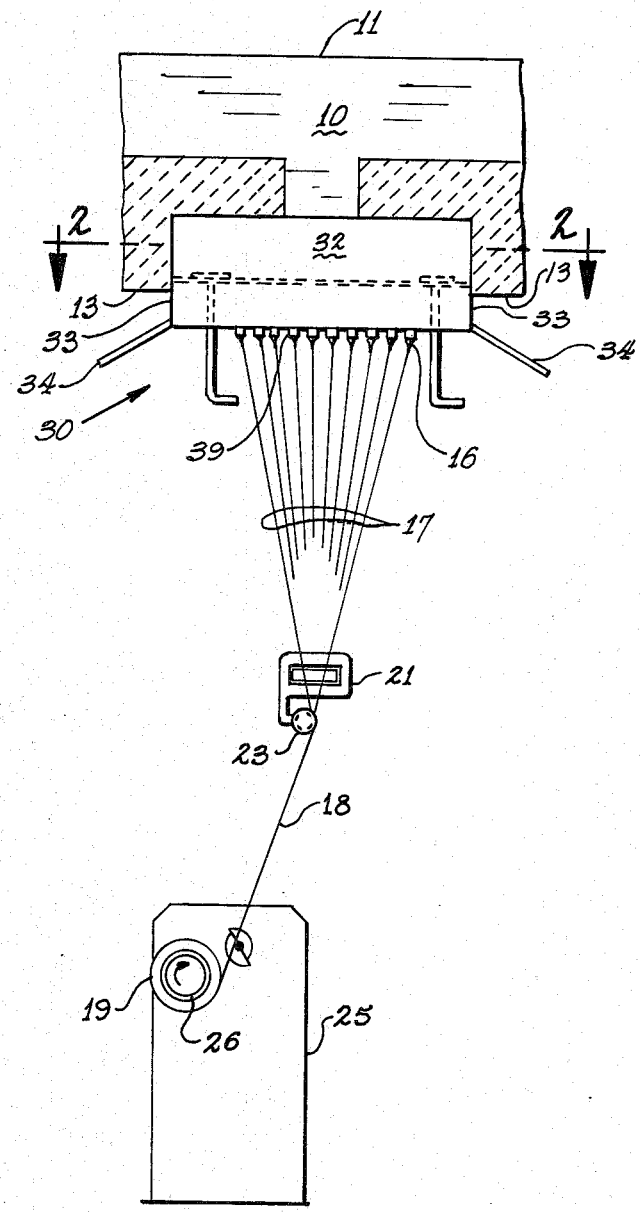
FIG. 1 is a schematic front elevational view of a glass fiber forming operation.

As shown in FIG. 1, conically shaped streams of molten glass 16, otherwise known as forming cones issuing from feeder 30, are attenuated into a plurality of filaments 17 through the action of attenuation means or winder 25. The newly formed filaments 17 receive a protective coating or sizing from coating applicator 21 as is known in the art. The coated filaments 17 are then gathered into a strand 18 at gathering means 23, which is collected as a helically wound package 19 on collet 26 of winder 25.

As such, the filaments formed are continuous filaments. However, it is to be understood that feeders employing the principles of the present invention are also readily applicable to the formation of discontinuous filaments and/or association with other attenuation means. Further, such feeders may be employed in the fiberization of other inorganic materials.

For the purposes of clarity, no cooling system for cooling the forming region and the newly formed glass fibers is shown. However, it is to be understood that any suitable cooling system, such as finshields and/or convective air cooling, may be employed.

As shown in FIG. 1, feeder 30 is positioned in the refractory of channel 13 which carries the body or pool of molten glass 10 to feeder 30 from a furnace (not shown).

As will be explained in more detail later herein, the overall head of molten glass, that is, the depth of the glass from top surface 11 to discharge wall 37, preferably remains substantially constant with the present invention providing adjustable control of the effective head pressure at the discharge wall.

Figure 2:
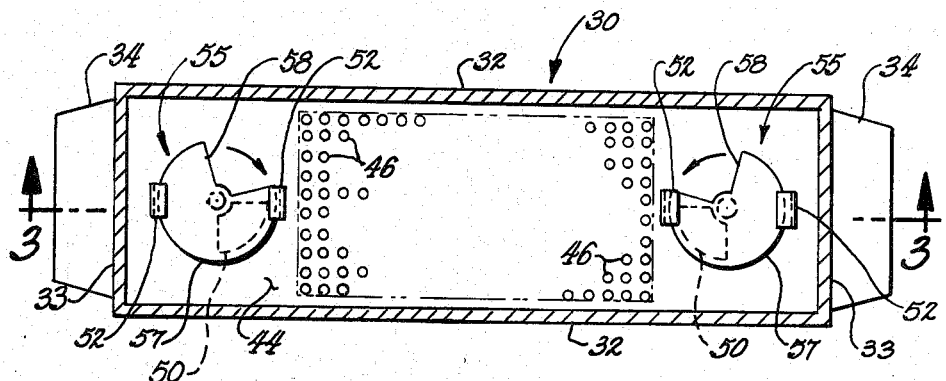
FIG. 2 is an enlarged cross-sectional view of the feeder shown in FIG. 1 taken along view 2—2.
Figure 3:
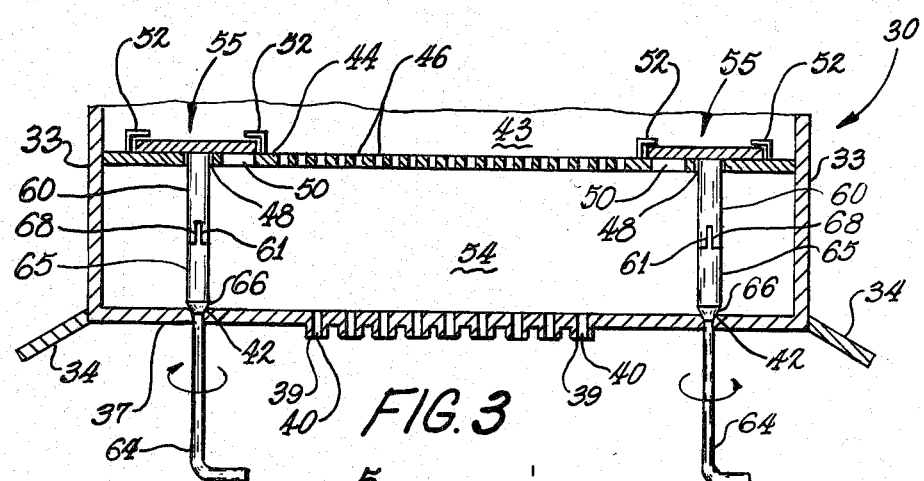
FIG. 3 is a cross-sectional view of the feeder shown in FIG. 2 taken along view 3—3.

As shown in FIGS. 1, 2 and 3, feeder 30 is comprised of sidewalls 32, endwalls 33 and a discharge wall 37 to retain the molten glass therein. As is known in the art, a pair of terminals or ears 34 are suitably attached to endwalls 33 (or discharge wall 37). Ears 34 are adapted to be connected to a suitable source of electrical energy (not shown) to provide electrical resistance heating of the feeder 30. Discharge wall 37 includes a plurality of projections 39 depending therefrom. Each projection 39 has at least one orifice 40 adapted to permit the molten glass to issue therefrom as a stream 16.

According to the principles of this invention, feeder 30 is designed to provide dripless and non-dripless operating characteristics when desired. Specifically, feeder 30 is rendered non-dripless when the restart of filament attenuation is desired from idled orifices.

With regard to "dripless" operation, aforementioned U.S. Pat. No. 4,488,891, which is hereby entirely incorporated herein by reference, describes in detail the design parameters for producing "dripless" operation. In short, dripless operation is established by reducing the pressure of the molten glass at the orifices to a pressure less than the internal pressure of a bead formed at an orifice upon the cessation of filament attenuation at that orifice but greater than the internal pressure of the forming cones during attenuation. As such, the reduced pressure of the molten glass at the discharge plate orifices prevents bead growth and drop from the orifices whereby the flow of molten glass from the disrupted orifices ceases. Conveniently, the pressure of the molten glass is reduced by means of a perforate pressure control plate 44 which imposes a pressure drop in the supply of molten glass which is (a) proportional to the rate of molten glass flow, and (b) effective to reduce the pressure above the orifice plate to a pressure (1) less than the internal pressure of the bead formed at a given orifice upon breakout at that orifice while the remainder of the orifices operate normally to produce filaments, and (2) greater than the internal pressure of the cones established during steady state attenuation.

The pressure control plate 44 is specifically designed, in terms of plate thickness, number and size of apertures 46 and with relation to the flow rate during filament production/attenuation to provide a pressure drop of such magnitude that the pressure at the exit ends of the orifices 40 of the discharge wall 37 preferably is substantially atmospheric for dripless operation. Even though the pressure at the discharge wall orifices has been reduced to such an extent that, upon a filament break at one of the orifices, the flow of molten glass from the orifice stops yet the pressure is sufficient for maintenance of fiber formation at the remaining orifices.

Of course, the thermal aspects of the fiber forming systems disclosed in the aforementioned "dripless" patent can be incorporated in the present invention to reduce or prevent "flooding", if desired.

As employed herein, "non-dripless" refers to the characteristic of the feeder wherein molten glass begins to flow or continues to flow from an orifice 40 to form a dripable bead or flow randomly over the face of the discharge wall 37 if no filament is being drawn at that orifice. As such, the pressure of the molten glass at the orifices 40 of discharge wall 37 is greater than the internal pressure of a bead formed at one of such orifices. This facilitates or permits the initiation or restart of filament production from the orifices.

Pressure control plate or regulator means 44 is positioned immediately above discharge wall 37 and divides the interior of feeder 30 into a first or upper chamber or zone 43 and a second or lower chamber or zone 54 which extends between pressure control plate 44 and discharge wall 37. As shown, a plurality of mechanical valve means 55 are associated with pressure control plate 44 to provide adjustable or variable control of the pressure of the molten glass at orifices 40 of discharge wall 37.

As shown, mechanical valve means 55 is comprised of a rotatable member or disk 57 having a flow control recess adapted to align with flow control perforation 50 in pressure control plate 44 when member 57 is located at a preselected or first position. With recess 58 aligned with perforation 50, the cross-sectional area of the passageway for the molten glass to flow from first chamber 43 to second chamber 54 is increased. As such, there will be a corresponding decrease in flow resistance from chamber 43 into chamber 54 which leads to an increase in effective head pressure at the orifices 40. Preferably, the pressure at the discharge wall 37 is sufficient to render the system "non-dripless" to permit the molten glass to bead down from idle orifices to permit a quicker restart of the attenuation process over a feeder only having a "fixed" size passageway system.

In other words, with valve means 55 "open", the molten glass passes through orifices 46 and perforations 50. Thus, the cross-sectional area of the passageway system between first zone 43 and second zone 54 through pressure regulation or control means 44 is increased. Accordingly, the flow resistance of control means 44 is decreased sufficiently to render the feeder "non-dripless". With valve means 55 "closed", the molten glass substantially only passes through orifices 46 to provide the appropriate "dripless" producing flow resistance/pressure drop.

Although two mechanical valve means 55 are shown, it is to be understood that any suitable number of valves may be employed.

Any suitable means may be employed to moveably position disks 57. As shown, disk 57 has a shaft 60 extending downwardly therefrom into second chamber 54. A slot or groove 61 is located at the distal end of shaft 60 which is adapted to mesh with stub shaft 68 of shaft 65 of actuator means or handle 64. Shaft 60 of rotatable member 57 is journaled in hole 48 in pressure control plate 44. Locator tabs 52, which are suitably joined to pressure plate 44 serve to further locate disk 57. Shaft 65 of handle 64 includes a tapered seat 66 which is adapted to seat in tapered bore 42 of discharge wall 37. The taper of bore 42 and seat 66 serves to hold handle 64 in discharge wall 37 as well as provide a seal to prevent excessive discharge of molten glass from around shaft 65.

Thus, according to the principles of this invention, a mechanical valve means is employed to permit part of the glass, in part, to bypass the highly restrictive apertures 46 of pressure control plate 44 to decrease the dynamic pressure drop across control plate 44 at predetermined times. Thus, with the instant invention, the effective pressure of the molten glass at the discharge wall may be adjusted or regulated in the absence of changing the overall height or head of the glass supply and/or adjusting the temperature of the molten glass.

Figure 4:
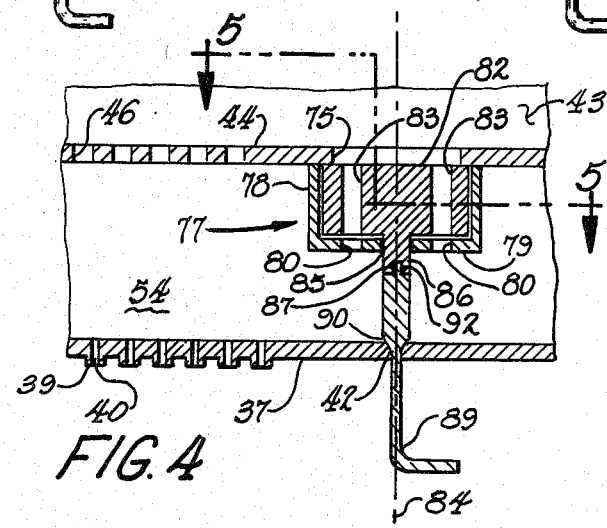
FIG. 4 is an enlarged cross-sectional frontal view of an alternative valve means according to the principles of this invention.
Figure 5:
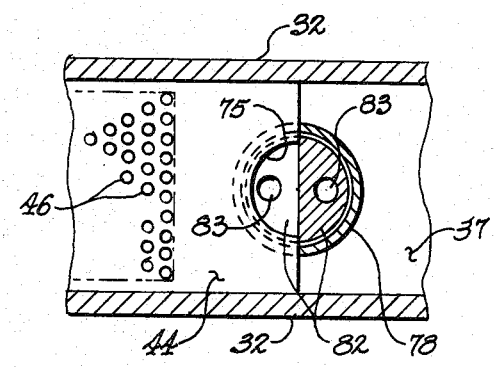
FIG. 5 is a cross-sectional top view of the valve system shown in FIG. 4.

Such valve systems may take any suitable configuration. As shown in FIGS. 4 and 5, valve means 77 is comprised of a sleeve 78 rigidly joined to control plate 44 at one end. At the opposite end, wall 79, having a plurality of orifices 80 extending therethrough, is joined to sleeve 78 to form the valve chamber 81 therein. Body 82 is rotatably positioned within sleeve 78. Body 82 has a plurality of bores 83 extending therethrough which are adapted to align with orifices 80 of wall 79 when body 82 is turned to the proper position.

Thus, when the restart of attenuation at previously idled orifices, that is, orifices at which filament attenuation and thus glass flow has been stopped, is desired, body 82 is rotated to align bores 83 with orifices 80 thereby increasing the cross-sectional area of the passageway between first chamber 43 and second chamber 54 to increase the effective head of the molten glass at discharge wall 37 according to the principles of this invention.

The upper end of chamber 81 is defined in part by control plate 44 which incorporates a port 75 therein to permit the molten glass to enter bores 83 of rotatable body 82. Body 82 rotates about axis of rotation 84.

When bores 83 of body 82 are not aligned with orifices 80 of wall 79, the valve is closed thereby reducing the cross-sectional area of the passageway system between first chamber 43 and second chamber 54 to that of the apertures 46 located in pressure control plate 44.

To position body 82, a shaft 86 extends therefrom having a slot at the distal end thereof which is adapted to accommodate the stub shaft 92 of handle 88 which extends from the exterior of the feeder into second chamber 54. The shaft 89 of handle 88 has a tapered section 90 which seats in tapered bore 42 of discharge wall 37. Thus, body 82 is rotated or adjusted by simply rotating handle 88.

Figure 6:
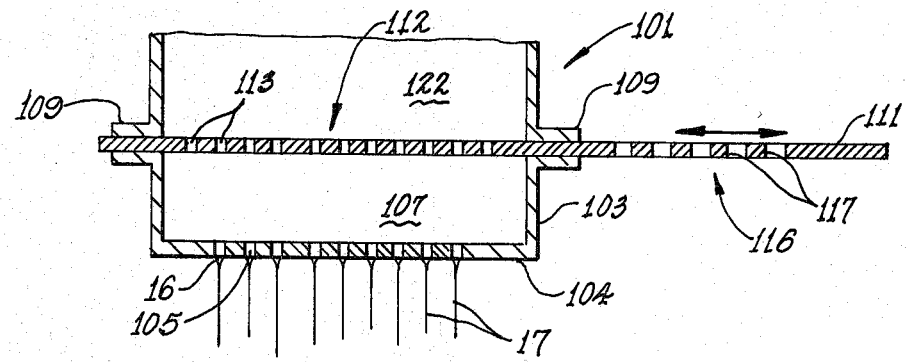
FIG. 6 is a cross-sectional view of yet another adjustable flow resistance pressure regulator according to the principles of this invention.
Figure 7:
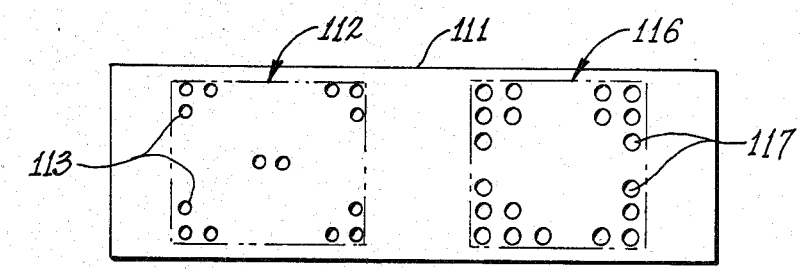
FIG. 7 is a top view of the slide gate system shown in FIG. 6 employed to adjust the effective head pressure at the discharge wall.

In another embodiment, the effective head pressure at the discharge wall of the feeder 101 may be increased or decreased as desired by incorporating a slide gate type mechanical valve means 110 in the feeder or between the feeder and its forehearth or the like. As shown in FIGS. 6 and 7, a slide gate type valve means 110 is positioned between housing 103 of feeder 101 and casing 120.

Valve means 110 is comprised of plate 111 having a first field 112 of apertures 113 adapted to restrict the flow of molten glass between upper chamber 122 and lower chamber 107 to render the operation of the feeder dripless. Plate 111 also contains a second field 116 of apertures 117 adapted to, when positioned in the path of the glass flow within feeder 101, to render the operation of the feeder "non-dripless". As such, the resistance to flow presented by the second field 116 is less than the flow resistance of first field 112.

During production, the plate 111 will be positioned such that the first field of apertures 113 render the feeder dripless. After a sufficient number of filaments have broken, the feeder may be quickly restarted by sliding plate 111 along seat 109 formed between housing 103 and casing 120 such that the second field 116 of apertures 117 have replaced the first field 112. Thus, the flow resistance of plate 111 is substantially reduced thereby permitting the molten glass to bead down from orifices 105 and discharge wall 104 to permit the fiber forming operation to be quickly restarted.

Thus, through the application of the instant invention, dripless feeders are rendered non-dripless at predetermined times to permit the rapid restart of such feeders.

Other adjustable flow restriction arrangements according to the principles of this invention are set forth in concurrently filed U.S. patent application Ser. No. 809,961 filed in the names of Jerome F. Marra and William M. Babbitt, which is hereby incorporated by reference in its entirety.

It is apparent that within the scope of the present invention, modifications and different arrangements can be made other than as herein disclosed. The present disclosure is merely illustrative with the invention comprehending all variations thereof.

INDUSTRIAL APPLICABILITY

The invention described herein is readily applicable to the glass fiber industry.

We claim:

1. A feeder means for supplying streams of molten glass to be attenuated into filaments comprising:
    a discharge wall having a plurality of orifices adapted to issue the molten glass as said streams;
    a plate having a plurality of apertures therethrough configured to establish dripless operation, said plate dividing the feeder into a first zone upstream of said plate and a second zone between said plate and said discharge wall;
    and at least one valve means in communication with the first and second zones adapted to selectively control the resistance to flow of the molten glass from the first to the second zone such that the feeder (1) operates in a dripless manner during filament production and (2) operates in a non-dripless manner to facilitate the re-start of the flow of molten glass from said orifices.

2. A feeder means for supplying streams of molten glass to be attenuated into filaments comprising:
    a discharge wall having a plurality of orifices adapted to issue the molten glass as said streams; and an element positioned to divide the feeder into a first zone upstream of said element and a second zone between said element and said discharge wall, said element having a passageway system interconnecting the first and second zones, the cross-sectional area of the passageway system being selectively variable such that the feeder (1) operates in a dripless manner during filament production and (2) operates in a non-dripless manner to facilitate the re-start of the flow of molten glass from said orifices.

3. A feeder means for supplying streams of molten glass to be attenuated into filaments comprising:
    a discharge wall having a plurality of orifices adapted to issue the molten glass as said streams; and a movable plate having a plurality of apertures therethrough positioned upstream of the discharge wall in the molten glass, the apertures of the plate being arranged such that the resistance to flow of the molten glass through the plate is varied as a function of the position of the plate to selectively control the resistance to glass flow therethrough such that the feeder (1) operates in a dripless manner during filament production and (2) operates in a non-dripless manner to facilitate the re-start of the flow of molten glass from said orifices.

4. A method of forming glass filaments comprising:
    (a) flowing molten glass from a first zone to a second zone through a control element means having a passageway system interconnecting the first and second zones;
    (b) flowing molten glass from the second zone through orifices in a discharge wall as a plurality of streams;
    (c) attenuating the streams into filaments;
    (d) flowing the molten glass through a plurality of apertures of constant size located in said control element to reduce the pressure of the molten glass at the discharge wall during attenuation to such an extent that upon a filament break at one of the orifices, the flow of molten glass from that orifice stops, yet the pressure is sufficient to continue filament attenuation at the other orifices, and
    (e) flowing the molten glass through a mechanical valve means to decrease said pressure reduction at the discharge wall so that the flow of molten glass is re-established from the orifice at which the glass flow has stopped.

5. The feeder means of claim 3 wherein said plate contains two fields of apertures.

6. The feeder means of claim 5 wherein said plate is slidably mounted.

7. The feeder means of claim 1 wherein said valve means is comprised of movable member adapted to adjustably expose a perforation in said plate interconnecting the first and second zones of the feeder.

8. The feeder means of claim 7 wherein said member is rotatable.

9. The feeder means of claim 8 wherein said valve means is manually operated.

10. The method of claim 4 wherein the valve means adjustably exposes a perforation in said control element to permit glass to flow through said perforation upon actuation of said valve means.

11. A method of forming glass filaments comprising:
 (a) flowing molten glass from a first zone to a second zone through a control element means having a passageway system interconnecting the first and second zones;
 (b) flowing molten glass from the second zone through orifices in a discharge wall as a plurality of streams;
 (c) attenuating the streams into filaments; and
 (d) varying the cross-sectional area of the passageway system at a region thereof to control the flow resistance of the passageway system to (i) reduce the pressure of the molten glass at the orifices to a pressure less than the internal pressure of a bead formed at an orifice upon the cessation of filament attenuation at that orifice, but greater than the internal pressure of the forming cones during attenuation; and, (ii) decrease said pressure reduction such that the pressure of the molten glass at the orifices is equal to or greater than the internal pressure of a bead formed at one of such orifices to facilitate re-start of filament attenuation from the orifices.

12. The method of claim 11 wherein said flow resistance is controlled by flowing the molten glass through a plurality of apertures of constant size located in said control element to establish the pressure reduction set forth in step (d) (i) and flowing the molten glass through a mechanical valve means to decrease said pressure reduction as set forth in step (d) (ii).

13. The method of claim 12 wherein the valve means adjustably exposes a perforation in said control element to permit glass to flow through said perforation upon actuation of said valve means.

14. The method of claim 11 wherein step (d) (ii) is effected in the absence of substantially increasing the temperature of the molten glass located in the second zone during step (d) (ii) over the temperature of the glass therein during step (d) (i).

15. The method of claim 11 wherein step (d) (ii) is effected in the absence of substantially increasing the pressure of the molten glass in the second zone.

16. The method of claim 14 further including electrically energizing the discharge wall to heat said discharge wall.

* * * * *